United States Patent [19]

Amick

[11] Patent Number: 4,474,401

[45] Date of Patent: Oct. 2, 1984

[54] ARCH-SHAPED STABILIZING AIRFOIL FOR VEHICLES

[76] Inventor: James L. Amick, 1464 Cedar Bend Dr., Ann Arbor, Mich. 48105

[21] Appl. No.: 441,350

[22] Filed: Nov. 15, 1982

[51] Int. Cl.³ .............................................. B62D 35/00
[52] U.S. Cl. .................................................... 296/1 S
[58] Field of Search .............. 296/1 S; 244/2; 114/43, 114/39; 180/7 R, 2 A

[56] References Cited

U.S. PATENT DOCUMENTS 3,804,428  4/1974  Amick .................................. 296/1 S
4,117,900  10/1978 Amick .................................. 296/1 S Primary Examiner—Robert R. Song
Attorney, Agent, or Firm—Stephenson and Boller

[57] ABSTRACT

An arch-shaped airfoil which provides aerodynamic directional stability to a surface transport vehicle, while minimizing the overturning moment due to lateral aerodynamic forces. In a preferred embodiment, the airfoil follows a circular arc in a transverse plane, and the lateral force developed on the airfoil in a crosswind acts at the center of the circular arc.

9 Claims, 5 Drawing Figures

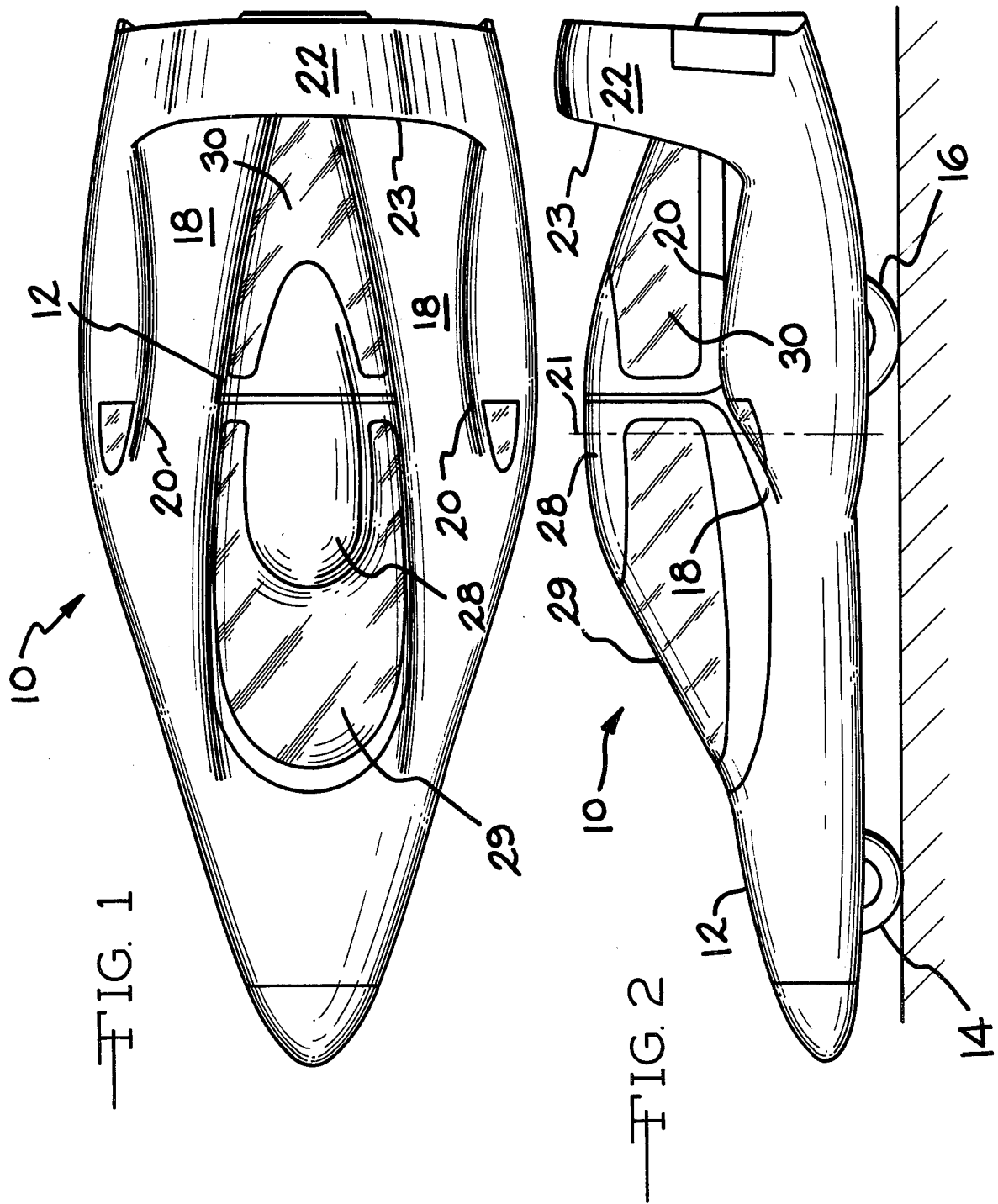

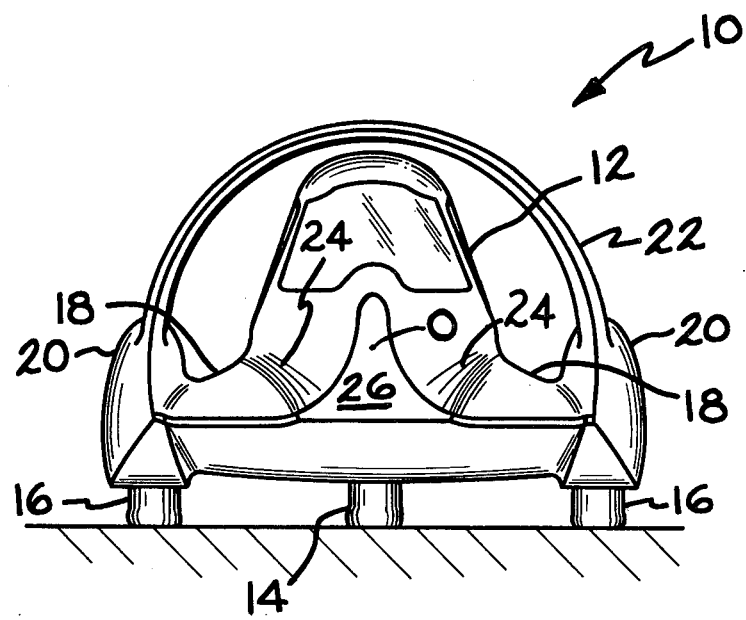
FIG. 3
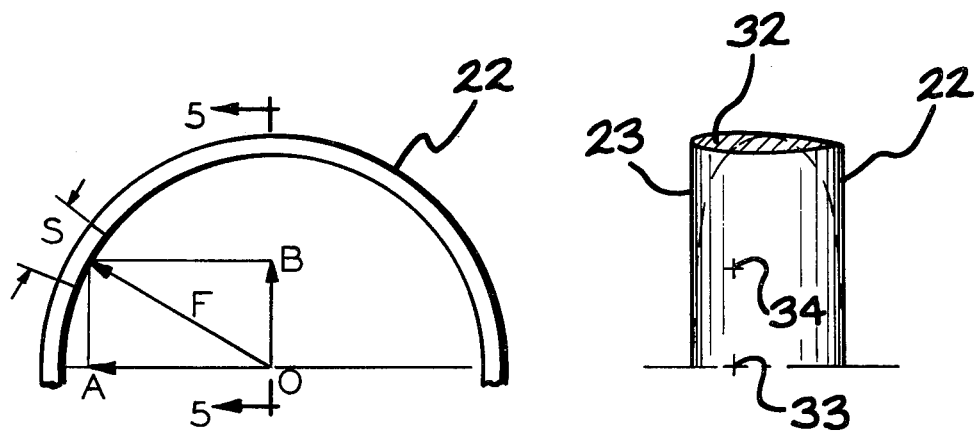
FIG. 4
FIG. 5

ARCH-SHAPED STABILIZING AIRFOIL FOR VEHICLES

BACKGROUND OF THE INVENTION

Conventional automobiles have an inherent aerodynamic instability which becomes dangerous under certain conditions. A slight crosswind, or a slight angle between the vehicle heading and its direction of travel (a yaw angle), creates aerodynamic forces on the vehicle which tend to increase the yaw angle, which in turn tends to increase the aerodynamic forces, and so on, so that when the tires have insufficient grip on the road (as on an icy bridge), the car will spin around.

This aerodynamic instability can be avoided by installing vertical stabilizing fins near the aft end of the vehicle, as described in U.S. Pat. No. 2,665,137. In addition to providing directional stability, such vertical airfoils have a fuel-saving function, as taught by U.S. patent application Ser. No. 223,230 filed by the inventor of the present invention. In the presence of a crosswind, vertical fins develop a forward thrust as a result of a suction region along the fin leading edge. Although vertical fins provide the important benefits of enhanced stability and fuel efficiency, they tend to develop large rolling moments in strong crosswinds, leading to an undesirable lateral tilting of the vehicle, and possibly even overturning. The possibility of overturning is increased for fins with inclined leading edges, since the suction along the inclined leading edges gives rise to lifting forces.

U.S. Pat. No. 3,804,428, granted to the inventor of the present invention, describes a vehicle with an inverted U-shaped or ring-shaped airfoil. Airfoils of this configuration have helped eliminate aerodynamic losses normally encountered at the tips of vertical airfoils. However, these airfoils have a center of lateral aerodynamic pressure which is substantially above the vehicle center of gravity and above the lowest point on the airfoil. As a result, these airfoils also tend to develop large rolling moments in strong crosswinds.

It is an object of the present invention, therefore, to provide an improved energy-efficient vehicle that will carry people in comfort and safety. It is another object of this invention to provide a stabilizing device for a surface transport vehicle which will promote directional stability and fuel conservation while minimizing the lateral rolling of the vehicle in a crosswind and the danger of lateral overturning.

SUMMARY OF THE INVENTION

The present invention has overcome the inadequacies of the prior art and provides a directionally stable, energy-efficient vehicle that meets the needs set forth above. The invention includes an improved stabilizing airfoil and an improved energy-efficient vehicle which incorporates the new airfoil for lateral stability.

Vertical fins used for stabilization in the prior art are replaced in this invention by an arch-shaped airfoil adapted to span the width of the rear of the vehicle. The arch has a much lower center of lateral aerodynamic force than a vertical fin or an inverted U-shaped airfoil, so that crosswinds impart less of a rolling moment to the airfoil of the present invention than to the airfoils and fins of the prior art. The leading edge of the arch shape airfoil can be in a near-vertical plane, so that leading edge suction contributes little or no lift in a crosswind.

In one form of the vehicle of this invention, a narrow fuselage with a single nose wheel is supported at the rear by two wheels connected to the fuselage by horizontal struts. The narrow fuselage seats two people in tandem, thus minimizing wind resistance by reducing frontal area. The horizontal struts allow the rear wheels to be sufficiently far apart to prevent overturning in extreme cornering situations. Fairings enclose the upper parts of the rear wheels and connect at their rear to the lower portions of an arch shaped stabilizing airfoil which is large enough to insure aerodynamic stability by bringing the center of aerodynamic lateral force rearward of the vehicle's center of gravity.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 1 is a top plan view of a three-wheeled vehicle embodying the present invention;

FIG. 2 is a side elevational view thereof;

FIG. 3 is a rear elevational view thereof;

FIG. 4 is a front diagrammatical view of a generalized arch-shaped airfoil of semi-circular shape; and FIG. 5 is a side elevational cross section of the airfoil of the invention, taken on the line 5—5 of FIG. 4, with the profile of an equivalent pair of vertical airfoils as described in the prior art superimposed thereon in broken lines.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The energy-efficient vehicle of this invention, indicated generally at 10 in the drawing, has a streamlined fuselage 12 of varying cross section tapering rearwardly so that the exterior surface thereof is of tear drop shape. The fuselage 12 is equipped with a single steerable nose wheel 14 and supported at the rear by two powered main wheels 16, which are connected to the fuselage by horizontal struts 18. Fairings 20 enclose the upper parts of main wheels 16. The arch-shaped airfoil of this invention, indicated at 22, is connected to the rear parts of the two fairings 20, rearwardly of the vehicle center of gravity, indicated by the broken line 21 in FIG. 2. Fillets 24 fill in the aft parts of the junctures between fuselage and horizontal struts, terminating in the blunt base 26. The driver occupies the front seat (not shown) of an enclosed cockpit 28, with a second seat (not shown) for a passenger behind the driver's seat. As seen in the drawings, a front wrap-around windshield 29 provides a view throughout a horizontal arc of some 250 degrees, and a full rear window 30 is also provided.

The features described above enable this vehicle 10 to carry two people in comfort and safety, and yet the vehicle has only about one-sixth the aerodynamic drag of a typical four-passenger subcompact automobile. The narrow fuselage 12 with its tandem seating arrangement minimizes wind resistance by reducing frontal area. The narrowness of the fuselage 12 is made possible by the horizontal struts 18, which place the rear wheels 16 far enough apart, approximately as in conventional four-wheeled automobiles, to provide complete stability against overturning. The arch-shaped airfoil 22 gives forward propulsive forces when a crosswind is present, and promotes directional stability while minimizing the rolling moment in the presence of crosswinds. The large blunt-based fillets 24 prevent boundary layer separation that would otherwise increase the aerodynamic drag.

The energy efficiency of this vehicle 10 is also enhanced by its very light weight, less than half that of the lightest four-passenger automobile. The arched airfoil 22 stabilizes the vehicle in the presence of crosswind disturbances, keeping it on course despite its light weight.

In the preferred embodiment of the airfoil 21, as seen in the drawings, the airfoil 22 has a substantially semi-circular frontal shape defined by a leading edge line 23 which is circularly arcuate. It is to be understood, however, that the stabilizing airfoil 22 of this invention is not restricted to circular arc frontal shapes, but may depart from the circular arc configuration as desired, with consequent variation in the aerodynamic performance. The leading edge line 23 should not, however, have sharp corners; that is, the radius of curvature of any portion of the leading edge line should not be less than about 1/20 of the span of the airfoil in a direction transversely on the vehicle 10.

Also, the leading and trailing edges of the airfoil need not lie in parallel vertical planes and the chord length (distance between leading and trailing edges) may vary around the arch. As seen in FIG. 5, the airfoil 22 has streamlined round-nosed tear drop or airfoil shape cross sections 32 in planes perpendicular to the leading edge 23.

The center of pressure of the lateral aerodynamic forces on an airfoil with circular-arc frontal shape is at the center of the arc, as can be seen in FIG. 4. The pressure force F on any segment S of the arc acts perpendicular to the surface, and hence, through the center O of the arc. The center O constitutes an axis extending longitudinally through the vehicle 10. The force F can be resolved into the component forces OB in the plane of symmetry and OA perpendicular to that plane. Only the component OA influences the rolling moment about the roll axis, since the component OB is in the plane of the roll axis and hence has no moment. The center of pressure is therefore at the arc center O.

This is much lower than the center of pressure of the equivalent pair of vertical airfoils (having similar lateral force characteristics), as shown in FIG. 5, wherein the center of pressure of the airfoil 22 is indicated at 33 and the center of pressure of the equivalent pair of vertical airfoils as described in the prior art is indicated at 34. The airfoil 22 is positioned on the vehicle 10 so as to cause the center of pressure to be as low as possible. Thus, as seen in FIGS. 3 and 4, the center of pressure O is located at or below the level of every point on the airfoil; this is accomplished in an airfoil of circular-arc frontal shape by limiting the arc to a semi-circle or lesser arcs.

The net lift force produced by the arch is small. If desired, a downward force may be provided by suitably inclining and/or cambering the streamwise cross sections of the arch nearest the plane of symmetry.

The vehicle 10 has several other advantageous features in addition to its energy-efficiency. The narrow nose of the fuselage 12 and the wedge-shaped plan form of the horizontal struts 18 make the vehicle extremely crash-worthy, causing it to glance off obstacles that are not encountered exactly head-on. The horizontal struts 18 also protect the occupants from side impacts to a much greater extent than do the doors of conventional cars. Collision avoidance is favored by the excellent forward vision enjoyed by the driver, since there are no wind-shield pillars nor passengers to obstruct his view anywhere throughout a horizontal arc of some 250 degrees. Because he is seated on the centerline of the vehicle, the driver can easily steer an optimum course between obstacles. When a stretch of slippery road is encountered, the arched airfoil 22 keeps the vehicle pointing straight ahead, rather than spinning around as do conventional automobiles with their inherent aerodynamic instability.

With its center of gravity 21 near the rear wheels 15, the vehicle 10 has 75 to 80 percent of its weight on the powered wheels. This gives it better traction in snow and mud than even the modern front-wheel-drive automobiles, which generally have less than 65 percent of their weight on the powered wheels. Parking is especially easy with this vehicle. It can make a U-turn between curbs only twenty-two feet apart.

The arch-shaped stabilizing airfoil 22 can also be used on 4-wheeled automobiles to improve their stability and energy-efficiency. The airfoil 22 may be mounted on the hatch or trunk lid, or it may be mounted outside the lid if constructed large enough to allow the lid to open within it.

High-speed water-borne vehicles can also benefit from the use of the arch-shaped stabilizing airfoil 22. In this application the arch can supply pitch stability in addition to directional stability, thus preventing end-for-end tumbling in extreme situations when the vehicle leaves the water surface.

What is claimed is:

1. A stabilizing airfoil comprising a substantially arch-shaped body substantially symmetrical about a vertical plane and having lower ends adapted to be attached to a vehicle, said body having leading and trailing edges and airfoil shape round-nosed cross sections in planes perpendicular to said leading edge, said body having its highest point substantially in said plane of symmetry and its lowest point at a level not substantially lower than the center of lateral aerodynamic pressure of said airfoil.

2. The airfoil according to claim 1 wherein said body is smoothly curved along its length so that it is without any sharp corners.

3. The airfoil according to claim 1 wherein said airfoil has a circular-arc frontal shape, defined by a leading edge line that is a substantially circular arc.

4. An energy-efficient surface transport vehicle comprising a tear drop shape body of variable cross section supported by front and rear wheels, struts extending outwardly from said body to said rear wheels and a substantially arch-shaped stabilizing airfoil attached to said vehicle at a position rearward of the center of gravity thereof, said airfoil being symmetrical about a vertical plane with its highest point in the plane of symmetry and its lowest point at a level not lower than the center of lateral aerodynamic pressure of said airfoil.

5. The vehicle according to claim 4 wherein said airfoil has streamlined round-nosed cross sections in planes perpendicular to the leading edge, said airfoil being smoothly curved along its length so that it is without any sharp corners.

6. The vehicle according to claim 4 wherein said airfoil has a circular-arc frontal shape defined by a leading edge line that is a substantially circular arc.

7. The vehicle according to claim 4 wherein the plane of symmetry of said vehicle is identical to the plane of symmetry of said airfoil.

8. The vehicle according to claim 4 wherein said struts extend from a position near the front end of said vehicle body to said rear wheels and increase progressively in width toward said rear wheels.

9. The vehicle according to claim 4 wherein said streamlined body converges rearwardly, and said vehicle further includes blunt-based fillets occupying the upper junctures between said body and said struts to prevent boundary layer separation.

* * * * *